Dec. 12, 1939. C. H. SPARKLIN 2,183,469
THERMOSTAT
Filed March 20, 1939
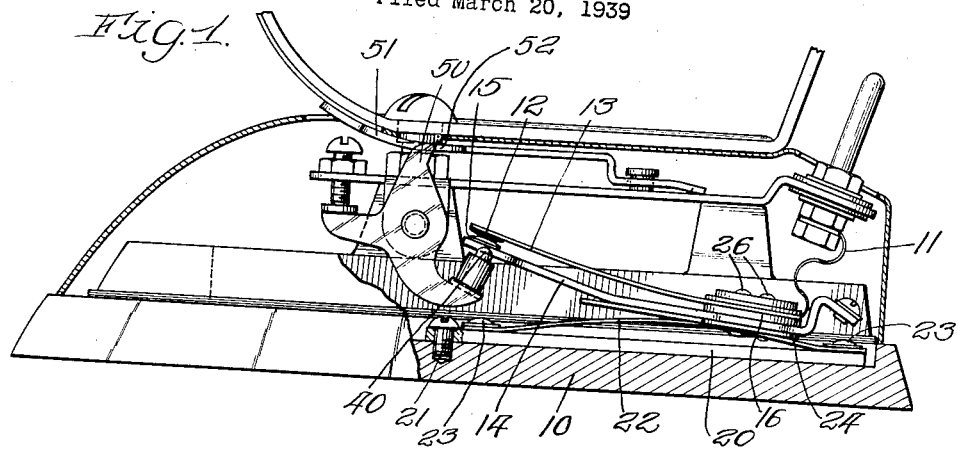
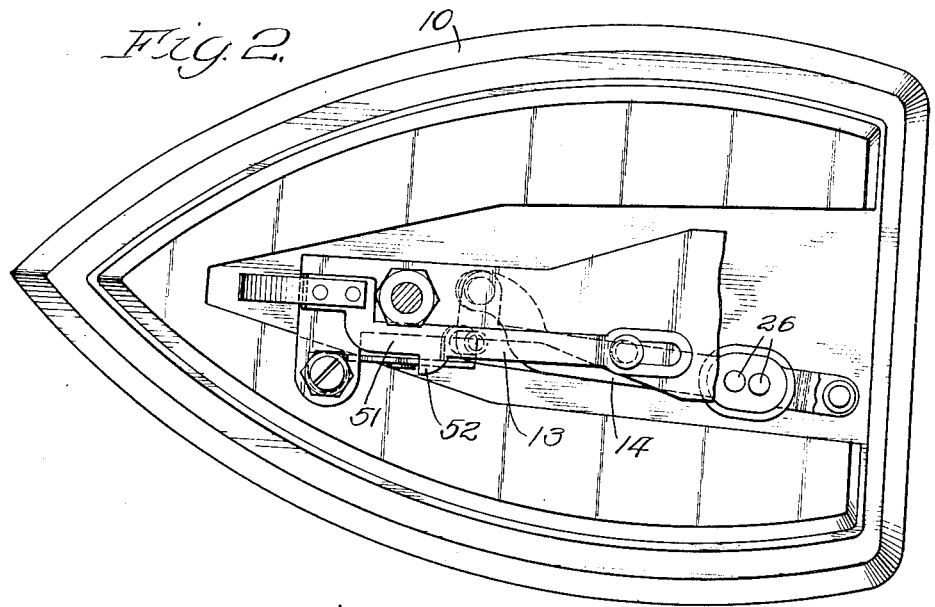
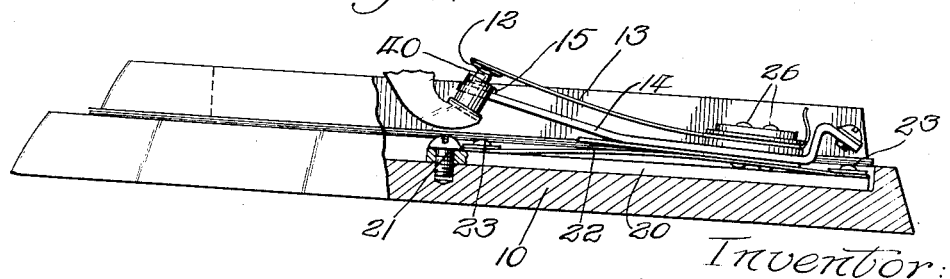
Inventor:
Charles H. Sparklin,
By Christen, Wiles, Davis, Hinckel, Dawson,
Attys.

Patented Dec. 12, 1939

2,183,469

UNITED STATES PATENT OFFICE 2,183,469

THERMOSTAT

Charles H. Sparklin, Chicago, Ill., assignor to Birtman Electric Company, Chicago, Ill., a corporation of Illinois Application March 20, 1939, Serial No. 262,949

2 Claims. (Cl. 200—137)

This invention relates to improvements in thermostats and more especially a thermostat adapted for use in connection with an electric iron.

For the purpose of illustrating the invention, the thermostat is here shown incorporated in an electric iron; but it is to be understood that it is capable of other uses.

Among the features of my invention is the provision of a thermostat empolying a thermal element which merely changes its length in operation but does not bend. This permits the mounting of the thermal element in close contact with the member, the temperature of which is to be controlled; and changes in elongation of the thermal element do not materially affect the contact. My thermal element is mono-metallic. In the use of bi-metallic elements, the curvature of which is affected by changes in temperature, a difficulty is usually encountered in maintaining a constant thermal relation between the thermal element and the member, the temperature of which is to be controlled. The bending or curving of the bi-metallic elements usually affects this relationship. This difficulty is usually overcome by the use of a mono-metallic thermal element which does not curve or bend but merely changes its length.

I realize that mono-metallic thermal elements have been employed before in thermostats and the elongation of the element used for operating the device. Heretofore, however, difficulty has been encountered in amplifying the movement. In a relatively short thermal element, such as is employed in an electric iron, it will be understood that the elongation is relatively slight. Consequently, some means must be employed to amplify this movement. One of the features of my invention is means for amplifying this elongation of the thermal element.

Other features and advantages will appear more fully as I proceed with my specification.

In that form of device embodying the features of my invention, shown in the accompanying drawing—

Fig. 1 is a view in vertical section; Fig. 2 is a top plan view; and Fig. 3 is a view similar to Fig. 1 showing the parts in another position.

As shown in the drawing, 10 may indicate the sole plate of an electric iron, the temperature of which is to be controlled.

The sole plate is adapted to be heated by any suitable electric resistance element (not shown) in any well known manner. The details of the heating element in electric circuit need not be shown as they are well known in the art. It will suffice to say that the heating current passes through the wire 11 to the contact 12 on the spring arm 13. 14 indicates an arm carrying the contact 15. When the contacts 12 and 15 are together, the circuit is completed, the current passing from the contact 12 to the contact 15 and hence through the arm 14. The arms 13 and 14 are insulated from each other by the insulating member 16 and are also insulated from ground. In other words, when the contacts 12 and 15 are together, current is completed through the heating element in the iron to heat the iron; and when they are separated, current is cut off to let the iron cool.

20 indicates a mono-metallic bar or thermal element lying on the sole plate 10 and attached thereto at one end by the screw 21. The other end of the bar is free so that it will elongate or shorten as it is heated and cooled. It will be seen that the bar 20 lies on the sole plate 10 in good contact therewith; and that this contact is not affected by elongations of the bar. It is to be understood that the thermal element 20 is preferably made of some material having a high coefficient of expansion by heat. Its fixed relation to the sole plate insures quick, accurate and uniform response to changes in temperature of the sole plate.

22 indicates a bowed member having its ends attached to the thermal element 20 by the rivets 23, 23. This bowed member is preferably made of spring steel having a relatively low coefficient of expansion by heat and is preferably under a slight spring tension in its bowed position. In other words, the member 22 may normally be straight but held in curved or bowed position by the rivets 23, 23.

The arms 13 and 14 are fastened together by the rivets 26, 26 which also mount said arms on the slope of the bowed or curved member 22. That is, the arms are attached to one side of the bowed member. The arms are insulated from the bowed member by the insulating material 24 and are also insulated from each other (except where and when the contacts 12 and 15 engage each other).

It will be seen that changes in length of the thermal element 20 will vary the curvature of the bowed member 22. This will vary the slope of said member upon which the arms 13 and 14 are carried to swing said arms. As shown in Fig. 1, the member 20 is cold and short so that the member 22 is convexed to a relatively great degree. As shown in Fig. 3, the member 20 has elongated to flatten out the bowed member 22. Cooling or shortening of the member 20, therefore, will swing the free members of the arms 13 and 14 upwardly. Elongating of the member 20 will swing them downwardly, as shown in Fig. 3.

40 indicates an adjustable stop adapted to engage the arm 13 at one side of the contact 12 (the arm 13 being offset at one end to permit this) when the arms swing downwardly to stop the arm 13 and cause the contacts 12 and 15 to separate, as shown in Fig. 3.

Switch mechanism may be provided for raising the stop mechanism 40 sufficiently to open the contacts even when the arms are up so as to cut off current to the iron even though it is cold. Such means may include the lever 50 adapted to be operated by the sliding member 51 with the shoulder 52 by manual means (not shown) on the handle (not shown) of the iron.

It will be seen also that the thermostat has some reverse or delayed action caused by heating of the curved member 22 from heat developed in the members 13 and 14 by electric resistance of the current flowing through them. That is, the device may be so made that when the contacts 12 and 15 are closed, the members 13 and 14 will be heated by the current flow therethrough to heat the member 22 somewhat faster than it would be heated from the sole plate alone. This will lengthen the member 22 to some extent, causing it to straighten out more slowly than it otherwise would and thus delay the opening of the contacts 12 and 15. As soon as the contacts open, however, current flow through the arms 13 and 14 is cut off and the arm 22, thus being deprived of heat from these members, will cool quite rapidly and thus be slow about again rounding up. The closing of the contacts will thus be delayed.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

What I claim as new, and desire to secure by Letters Patent, is:

1. A thermostat, including: a straight thermal element and a bowed member having their ends connected, whereby variations in length of the thermal element will vary the curvature of the bowed member; and a pair of arms each having one end attached to the slope of the bowed element, the other ends of said arms carrying contacts.

2. In combination with a member, the temperature of which is to be controlled: a thermal element in fixed relation to said member; a bowed member having its ends connected to the ends of the thermal element; and a pair of arms each having one end attached to the slope of the bowed element, the other ends of said arms carrying contacts.

CHARLES H. SPARKLIN.